(12) United States Patent
Ramirez Blanco et al.

(10) Patent No.: US 8,191,825 B2
(45) Date of Patent: Jun. 5, 2012

(54) FAIRING SYSTEM FOR A HORIZONTAL STABILISER OF AN AIRCRAFT AND PROCESS FOR INSTALLING SAID SYSTEM

(75) Inventors: Gonzalo Ramirez Blanco, Madrid (ES); Jose Luis Lozano Garcia, Madrid (ES)

(73) Assignee: Airbus Operations S.L., Madrid (ES)

( * ) Notice: Subject to any disclaimer, the term of this patent is extended or adjusted under 35 U.S.C. 154(b) by 530 days.

(21) Appl. No.: 12/395,831

(22) Filed: Mar. 2, 2009

(65) Prior Publication Data
US 2010/0163672 A1 Jul. 1, 2010

(30) Foreign Application Priority Data
Dec. 29, 2008 (ES) .................................. 200803724

(51) Int. Cl.
*B64C 1/00* (2006.01)
*B64C 9/00* (2006.01)
(52) U.S. Cl. ........................................................ 244/87
(58) Field of Classification Search ............... 244/123.1, 244/131, 132, 130, 87, 88
See application file for complete search history.

(56) References Cited

U.S. PATENT DOCUMENTS
2,981,504 A * 4/1961 Parker ....................... 244/117 R
* cited by examiner

*Primary Examiner* — Tien Dinh
*Assistant Examiner* — Nicholas McFall
(74) *Attorney, Agent, or Firm* — Oblon, Spivak, McClelland, Maier & Neustadt, L.L.P.

(57) ABSTRACT

A fairing system for a horizontal stabilizer of an aircraft and to a process for installing said system, such that the fairing system for the sealing of the horizontal stabilizer and the fuselage of the aircraft includes a primary fairing arranged on the horizontal stabilizer of the aircraft, the primary fairing being solidly connected to the horizontal stabilizer which is in turn trimmable with respect to the fuselage, the fairing system in turn comprising a secondary fairing such that the primary fairing is coupled to the horizontal stabilizer through supports arranged in the direction of the chord of the primary fairing, said supports being located in the outer part of said primary fairing with respect to the fuselage, the secondary fairing being arranged in the outer part of the supports.

10 Claims, 2 Drawing Sheets

KNOWN ART

FAIRING SYSTEM FOR A HORIZONTAL STABILISER OF AN AIRCRAFT AND PROCESS FOR INSTALLING SAID SYSTEM

FIELD OF THE INVENTION

The present invention relates to a fairing system for a horizontal stabiliser of an aircraft, as well as to a process for installing such a system on the mentioned horizontal stabiliser.

BACKGROUND OF THE INVENTION

In the aeronautics field, the coupling between the horizontal stabiliser of an aircraft with the fuselage of the mentioned aircraft is typically covered by means of fairings, said fairings covering and protecting the gap or space existing between both surfaces, i.e., between the fuselage and the horizontal stabiliser. Due to the fact that the horizontal stabiliser is trimmable with respect to the surface of the fuselage of the aircraft, and therefore needs a gap or space for said trimming movement, this space between both surfaces must be covered to avoid possible suction problems which would arise from the existence thereof, this space thus being covered by means of the fairings.

Traditionally, the support system for the fairings covering the gap existing between the fuselage of the aircraft and the trimmable horizontal stabiliser thereof has always been carried out from the inside of the mentioned fairings, on the surface of the stabiliser of the aircraft. The actual fairing thus hides its fittings or support members outside the fuselage, although this same fact makes the setting or adjustment of the fairing in its installation on the stabiliser require a complex and laborious process.

The usual structure of the fairing supports comprises a fitting or support and a base plate solidly fixed to the skin of the stabiliser, such that the fitting or support is fixed in turn to said base plate. The fitting or support thus moves freely until it is fixed to the base plate, its movement thus being restricted once the correct position thereof has been achieved.

Due to the great importance that the adjustment of this type of members has, said adjustment must be very precise to ensure the aerodynamic sealing between the horizontal stabiliser and the fuselage, and thus reduce the losses by parasitic drag. In traditional fairings, this setting or adjustment is carried out in several steps, an iterative adjustment method being applied, which requires an assembly and disassembly of the fairings on repeated and iterative occasions, until achieving the correct position of the mentioned fairings on the horizontal stabiliser of the aircraft, which involves processes requiring a lot of time and which are therefore very expensive.

The present invention solves the problems set forth above.

SUMMARY OF THE INVENTION

The present invention thus primarily relates to a fairing system covering the gap between the horizontal stabiliser and the fuselage of an aircraft, said system being supported by its outer part on the skin of the horizontal stabiliser.

The fairing system of the invention comprises a primary fairing and a secondary fairing, said primary fairing being arranged on the skin of the mentioned horizontal stabiliser through a series of fittings, the secondary fairing in turn covering the support fittings of the primary fairing. The primary fairing is in turn supported on the fuselage of the aircraft, thus allowing a correct sealing of the system on the mentioned fuselage.

Such an arrangement greatly simplifies the adjustment of the fairing system. In a second aspect, the present invention thus relates to a process for installing the fairing system on the horizontal stabiliser, such that said process allows carrying out system adjustment operations from the outside, the need to assemble and disassemble the fairings on repeated occasions to then proceed to their setting, thus being eliminated.

Other features and advantages of the present invention will be inferred from the following detailed description of an illustrative embodiment of its object in relation to the attached figures.

DETAILED DESCRIPTION OF THE INVENTION

Figure 1:
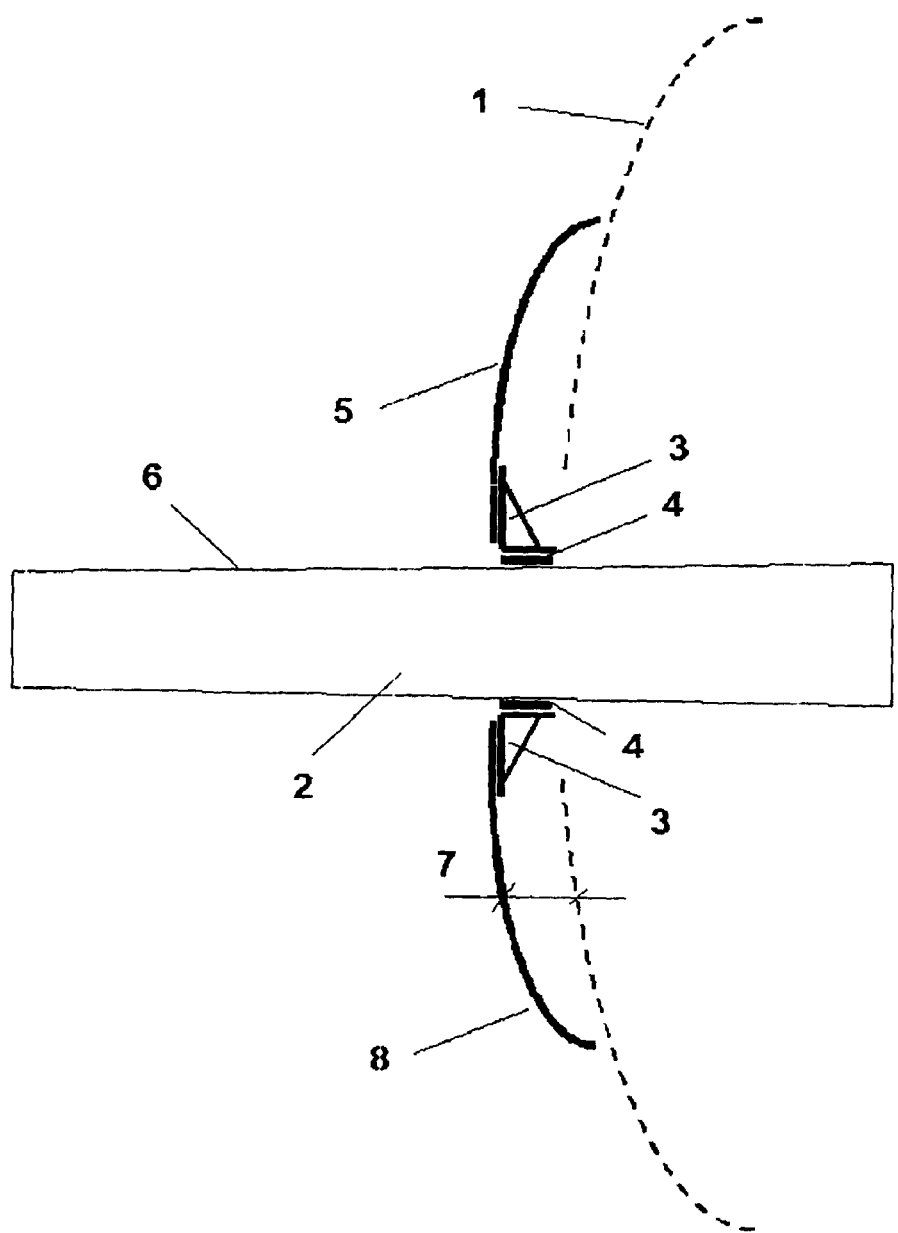
FIG. 1 schematically shows a typical section of the fairing assembly in a horizontal stabiliser to cover the inlet of said stabiliser in the fuselage of the aircraft.

According to the known art (FIG. 1), the support system for supporting the upper fairing 5 and the lower fairing 8 covering the gap existing between the fuselage 1 of the aircraft and the trimmable horizontal stabiliser 2 thereof is carried out from the inside of the mentioned fairings 5 and 8. Said upper 5 and lower 8 fairings are attached to the skin 6 of the horizontal stabiliser 2 through a support 3 and a support base 4. The actual upper 5 and lower 8 fairings thus hide these supports 3 on the outside of the fuselage.

With a configuration like that which has been mentioned, the support 3 of the fairings 5 and 8 moves freely until it is fixed to the base 4 of said support, which is coupled to the skin 6 of the horizontal stabiliser 2, its movement thus being restricted once its correct position has been achieved. In traditional fairings 5 and 8, this setting or adjustment is carried out in several steps, an iterative adjustment method being applied, which requires an assembly and disassembly of the fairings 5 and 8 on repeated and iterative occasions, until achieving the correct position of the mentioned fairings 5 and 8 on the fuselage 1 of the aircraft, which is very expensive and laborious, as mentioned above.

According to the known configuration, there exist several supports 3 arranged in the direction of the chord of the upper fairing 5 and of the lower fairing 8, which are fixed, through their base 4, to the skin 6 of the horizontal stabiliser 2 by means of a series of slots or grooves arranged thereon. The setting or adjustment operation for setting or adjusting the supports 3 to the skin 6 requires assembling and disassembling the supports 3 and the bases 4, and thus the upper fairing 5 and the lower fairing 8, on repeated occasions (iterative process), this process furthermore being carried out support by support. These supports 3 are preloaded, such that the upper fairing 5 and the lower fairing 8 are not separated from the fuselage 1 of the aircraft during the movement or trimming of the stabiliser 2 (the fairing is mobile and solidly connected to the stabiliser 2, which is trimmable with respect to the fuselage 1).

The space or distance 7 between the stabiliser 2 and the fuselage 1 is controlled and it must allow a correct sealing between both members. The distance 7 is typically between 50 and 60 mm.

According to a first object of the invention, the gap between the trimmable horizontal stabiliser 2 of the aircraft and the fuselage 1 thereof is covered through a primary fairing, said primary fairing comprising an upper primary fairing 50 and a lower primary fairing 51, and through a secondary fairing, said secondary fairing in turn comprising an upper secondary fairing 80 and a lower secondary fairing 81. The primary fairing, i.e., the upper primary fairing 50 and the lower primary fairing 51, is supported and coupled to the skin 6 of the horizontal stabiliser 2 at the outer part of the primary fairings 50 and 51, by means of supports 30 with bases 40, the supports 30 being coupled to the primary fairing and the bases 40 being coupled to the skin 6 of the stabiliser 2. The secondary fairing, i.e., the upper secondary fairing 80 and the lower secondary fairing 81, are in turn arranged on the outer part of the supports 30 and of the bases 40, thus covering the support fittings of the primary fairings 50 and 51.

The design of the fairing system that is thus presented in the invention comprises a primary fairing and a secondary fairing covering the coupling between the stabiliser 2 and the fuselage 1, through supports 30 located on the outside of the primary fairing.

In a second aspect, the present invention relates to a process for installing the previous fairing system on the horizontal stabiliser, as well as its setting for adjusting it to the fuselage 1. The arrangement of supports 30 according to the invention (FIG. 2) thus greatly simplifies the assembly and adjustment of the primary and secondary fairings on the horizontal stabiliser 2, since it allows performing adjustment operations with the primary fairing (upper primary fairing 50 and lower primary fairing 51) installed on the fuselage 1, eliminating the need to assemble and disassemble the member on repeated occasions. Both the time and the operations necessary for installing the fairings are thus reduced.

The design of the support 30 and of the base 40 according to the invention can be similar to those normally used (FIG. 1): the base 40 is fixed to the skin 6 of the stabiliser 2, and the support 30 allows the setting of the stabiliser assembly 2 and the fuselage 1.

Figure 2:
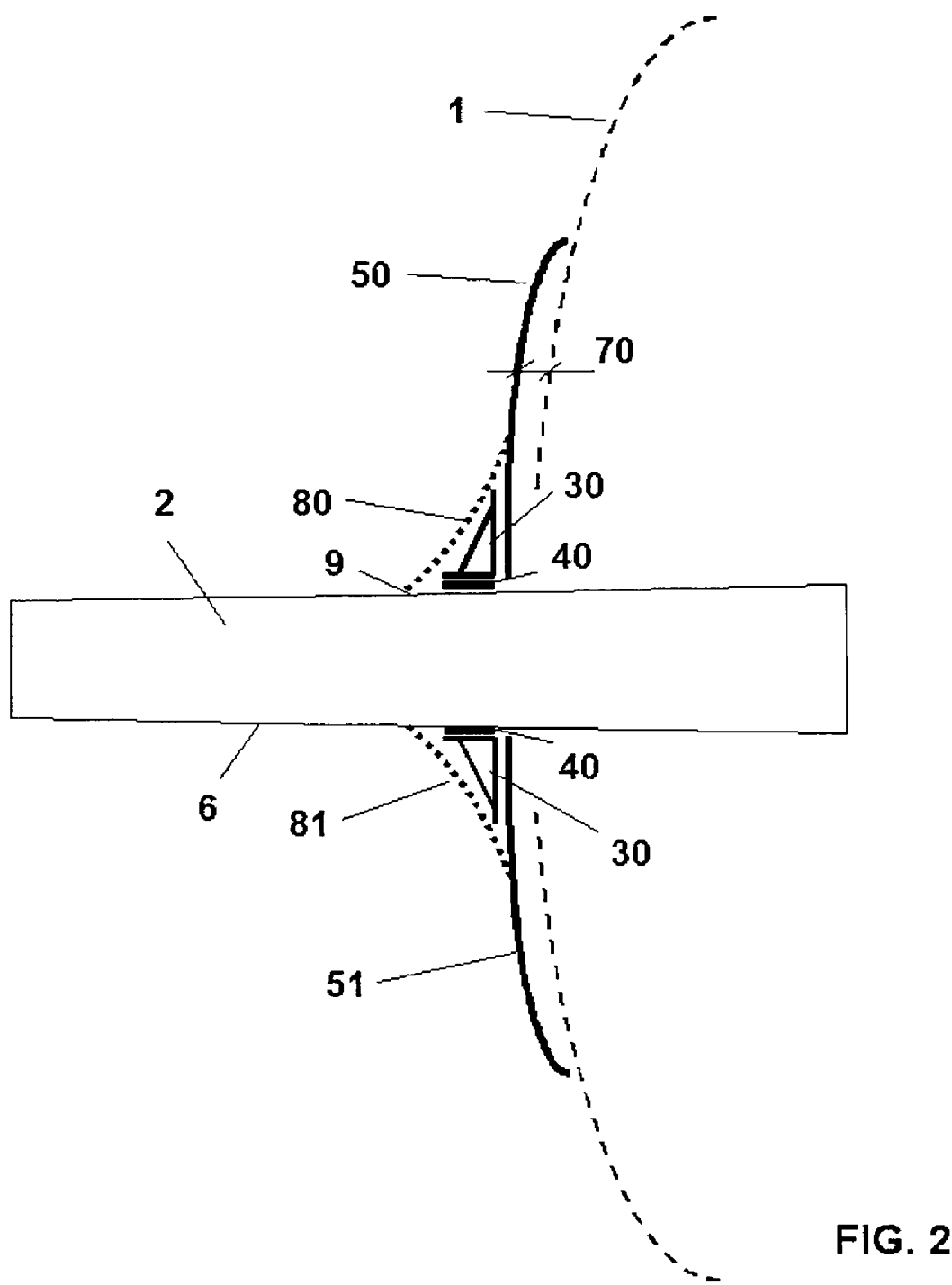
FIG. 2 schematically shows a section of the assembly of the fairing system of the invention in a horizontal stabiliser to cover the inlet of said stabiliser in the fuselage of the aircraft.

As has been described, the solution of the invention requires a secondary fairing (upper secondary fairing 80 and lower secondary fairing 81), the purpose of which is to cover the supports 30 of the primary fairing (upper 50 and lower 51 primary fairing), offering a good aerodynamic performance of the assembly. This additional secondary fairing can be installed once the adjustment and final fixing of the primary fairing on the skin 6 and the fuselage 1 has been carried out by means of known standard fixing members, preferably further comprising beads 9 of sealing material to aerodynamically seal the part of the coupling, as shown in FIG. 2.

The distance 70 (FIG. 2) between the surface of the fuselage 1 and the primary fairing is much less than the distance 7 in the traditional configuration (FIG. 1). This distance 70 must exist to counteract the suction effect which would tend to separate the fuselage 1 from the primary fairing, since there exists between both surfaces a difference of pressures, and since they are preloaded one on top of the other.

The primary fairing (upper 50 and lower 51 primary fairing) of the invention is made of a composite material, preferably carbon fibre, or a metallic material, and must not have protection against rays. The secondary fairing (upper 80 and lower 81 secondary fairing) is made of a composite material, typically carbon fibre or fibreglass. This secondary fairing does not have protection against rays. Furthermore, this secondary fairing does not suffer stresses, since it does not work; it only covers the primary fairing and the supports 30.

The base 40 of the supports 30 according to the invention comprises, as in the traditional solution, notches or grooves to allow adjusting the primary fairing to the fuselage 1, at a distance 70 less than the distance 7 in FIG. 1.

In the configuration of the invention, the supports 30 are already attached to the primary fairing through their base 40, such that they only have to be adjusted to the skin 6 of the stabiliser 2 by means of the corresponding grooves and once fixed, they are covered by means of installing the secondary fairing. The process is thus much simpler and quicker than the traditional assembly process (FIG. 1).

The main advantages of the fairing system of the invention are thus the following:
improvement of the fairing system assembly process;
easy setting of the primary fairing to optimise the sealing thereof against the fuselage 1;
the configuration of the invention eliminates problems of interferences in the movement of the fairing with the supports 30 (problems which existed in this movement with the traditional configuration);
the supports 30 are more accessible for installation, inspection and maintenance, since they can be accessed for said operations by simply disassembling the secondary fairing;
the aerodynamic profile of the primary and secondary fairings, on the outside, encroaches less upon the aerodynamic profile of the stabiliser 2 in comparison with the fairings of traditional design (FIG. 1), since it allows a fairing geometry which projects less from the surface of the fuselage 1.

Those modifications which are comprised in the scope defined by the following claims can be introduced in the preferred embodiment which has been described.

The invention claimed is:

1. A fairing system for sealing of a horizontal stabiliser and a fuselage of an aircraft, comprising:
a primary fairing arranged on the horizontal stabiliser of the aircraft, the primary fairing being solidly connected to the horizontal stabiliser which is in turn trimmable with respect to the fuselage, the primary fairing being located adjacent to and outboard of the fuselage; and
a secondary fairing located outside of the fuselage such that the primary fairing is coupled to the horizontal stabiliser through supports arranged along an outer surface of the horizontal stabiliser, said supports being located outboard of said primary fairing and the fuselage, the secondary fairing being arranged outboard of the supports, the primary fairing, and the fuselage.

2. The fairing system according to claim 1, wherein a surface of the fuselage and the primary fairing, are a distance apart, counteracting the suction effect tending to separate the fuselage from the primary fairing since there exists between both surfaces a difference of pressures, and since they are preloaded one on top of the other.

3. The fairing system according to claim 2, wherein the distance is less than 50 mm.

4. The fairing system according to claim 1, wherein the supports are fixed to skin of the horizontal stabiliser through a base comprising grooves.

5. The fairing system according to claim 1, further comprising:
beads of sealing material to aerodynamically seal part of a coupling between the secondary fairing and skin of the stabiliser.

6. The fairing system according to claim 1, wherein the primary fairing is made of a composite material.

7. The fairing system according to claim 6, wherein the primary fairing is made of carbon fibre.

8. The fairing system according to claim 6, wherein the secondary fairing is made of a composite material.

9. The fairing system according to claim 8, wherein the secondary fairing is made of fibreglass.

10. A process for installing a fairing system according to claim 4 on the horizontal stabiliser of an aircraft, comprising:
separately installing the supports with their base on the primary fairing;
placing the assembly formed by the primary fairing and the supports with their bases on the skin of the stabiliser, due to the adjustment or setting provided by the grooves of the mentioned bases; and
placing the secondary fairing on the previous assembly, thus fixing the primary fairing to the skin of the stabiliser, achieving an aerodynamic assembly.

* * * * *